(12) United States Patent

Gadd et al.

(10) Patent No.: US 12,583,613 B2

(45) Date of Patent: Mar. 24, 2026

(54) CONTROLLING AIRCRAFT INERTING SYSTEM

(71) Applicant: AIRBUS OPERATIONS LIMITED, Bristol (GB)

(72) Inventors: Matthew Gadd, Bristol (GB); Adam Fallon, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 242 days.

(21) Appl. No.: 18/473,903

(22) Filed: Sep. 25, 2023

(65) Prior Publication Data

US 2024/0101268 A1     Mar. 28, 2024

(30) Foreign Application Priority Data

Sep. 26, 2022    (GB) ..................................... 2214035

(51) Int. Cl.
B64D 37/32          (2006.01)
B01J 19/14          (2006.01)

(52) U.S. Cl.
CPC .............. B64D 37/32 (2013.01); B01J 19/14 (2013.01)

(58) Field of Classification Search
CPC ................................. B64D 37/32; B01J 19/14
See application file for complete search history.

(56) References Cited

U.S. PATENT DOCUMENTS

| | | | |
|---|---|---|---|
| 7,509,968 B2 | 3/2009 | Surawski | |
| 9,114,886 B2 | 8/2015 | Gupta | |
| 2014/0208943 A1* | 7/2014 | Gupta | B64D 37/32 95/146 |
| 2014/0238501 A1* | 8/2014 | Tichborne | B64D 37/32 137/12 |
| 2016/0176535 A1 | 6/2016 | Family et al. | |
| 2022/0316410 A1* | 10/2022 | Swann | B64D 27/33 |
| 2022/0358696 A1* | 11/2022 | Holder | G08G 5/54 |

FOREIGN PATENT DOCUMENTS

| | | |
|---|---|---|
| CN | 109552648 B | 2/2022 |
| EP | 1253077 | 10/2002 |
| EP | 3037353 A1 | 6/2016 |
| EP | 3063066 B1 | 9/2016 |
| EP | 3208197 A1 | 8/2017 |
| GB | 2520728 A | 6/2015 |
| GB | 2576951 A | 3/2020 |

OTHER PUBLICATIONS

Otsuka et al., Occupational Exposure to Gaseous and Aerosolized Volatile Organic Compounds in Flight Line Crews Using Different Types of Jet Fuel, Online:https://www.jstage.jst.go.jp/article/sujms/29/3/29_231/_pdf/-char/en, Sep. 2017, pp. 231-240, 29(3), Showa University Journal of Medical Science.
Search Report for GB2214035.4 dated Mar. 28, 2023, 4 pages.
European Search Report for Application No. 23198729.8, six pages, dated Feb. 9, 2024/.

* cited by examiner

*Primary Examiner* — Brandon D Lee

(74) *Attorney, Agent, or Firm* — Nixon & Vanderhye, PC

(57)          ABSTRACT

A method of controlling an inerting system of an aircraft is disclosed. The inerting system feeds inert gas into a fuel tank of the aircraft, the method includes: a) obtaining a location of the aircraft, the location comprising a current location or an expected future location; b) assessing an environmental impact of releasing of fuel vapour at the location obtained in step a); and c) controlling the inerting system based on the assessment of step b).

11 Claims, 1 Drawing Sheet

CONTROLLING AIRCRAFT INERTING SYSTEM

CROSS RELATED APPLICATION

This application claims priority to United Kingdom Patent Application GB 2214035.4, filed Sep. 26, 2022, the entire contents of which is hereby incorporated by reference.

FIELD OF THE INVENTION

The present invention relates to a method of controlling an inerting system of an aircraft, and an aircraft.

BACKGROUND OF THE INVENTION

US2014/0238501 discloses a method of controlling a flow rate of inerting gas introduced into a vented aircraft fuel tank. The method comprises: monitoring changes in a quantity of a fuel in the aircraft fuel tank; monitoring changes in the ambient air pressure external to the aircraft fuel tank; and actively controlling a flow rate of inerting gas introduced into the aircraft fuel tank based upon changes in the quantity of fuel in the fuel tank and changes in the ambient air pressure.

By reducing the volume of inert gas that may otherwise be unnecessarily fed into the fuel tank, which will inevitably be pushed out of the fuel tank vent system, there will be a reduction in emissions. By reducing the amount of fuel vapour and/or carbon-dioxide rich oxygen-depleted air (ODA) that is pushed out into the atmosphere, the invention may also provide environmental benefits, particularly at high altitude during cruise where contrails may develop.

SUMMARY OF THE INVENTION

A first aspect of the invention provides a method of controlling an inerting system of an aircraft, wherein the inerting system feeds inert gas into a fuel tank of the aircraft, the method comprising: a) obtaining a location of the aircraft, the location comprising a current location or an expected future location; b) assessing an environmental impact of releasing of fuel vapour at the location obtained in step a); and c) controlling the inerting system based on the assessment of step b).

Optionally the location comprises a global location or altitude.

Optionally the location comprises a global location.

Optionally the global location comprises global location coordinates (for instance coordinates obtained from a Global Navigation Satellite System). Alternatively the global location may comprise an identification of an airport or any other identification of a global location.

Optionally the location comprises an altitude.

Optionally step a) of obtaining an expected future location comprises receiving a flight plan of an aircraft, the flight plan comprising a series of expected future locations of the aircraft during one or more flights; and step b) of assessing comprises assessing an impact of releasing fuel vapour at each of the series of expected future locations.

A further aspect of the invention provides a method of controlling an inerting system of an aircraft, wherein the inerting system is configured to feed inert gas into a fuel tank of the aircraft, the method comprising: a) obtaining an environmental condition local to the aircraft; b) assessing an environmental of releasing fuel vapour based on the environmental condition obtained in step a); and c) controlling the inerting system based on the assessment of step b).

A further aspect of the invention provides an aircraft comprising: a fuel tank; an inerting system configured to feed inert gas into the fuel tank; and an automated control system coupled to the inerting system, wherein the automated control system is configured to control the inerting system by the method of either preceding aspect.

The comments below apply to any or all aspects of the invention, where applicable.

Step c) of controlling may be performed automatically by an automated control system, or it may be performed manually.

Optionally step c) of controlling comprises turning the inerting system off so that the inerting system stops feeding inert gas into the fuel tank and/or turning the inerting system on so that the inerting system starts feeding inert gas into the fuel tank.

Optionally step c) of controlling comprises generating an inerting plan based on the assessment of step b), and then controlling the inerting system based on the inerting plan.

Optionally the inerting system is controlled based on the inerting plan during a flight, and the inerting plan is generated before the flight.

Optionally the feeding of the inert gas into the fuel tank causes fuel vapour to be released from the fuel tank into the atmosphere. The fuel vapour may be directly released from the fuel tank into the atmosphere, or indirectly released from the fuel tank into the atmosphere—for instance via a vent tank.

The assessment of environmental impact may be performed by operating a command algorithm to automatically assess the environmental impact based on the environmental condition and/or the location of the aircraft.

Optionally the aircraft further comprises a control-parameter system configured to obtain one or more control-parameters, the automated control system is coupled to the control-parameter system, and the automated control system is configured to automatically control the inerting system on a basis of the one or more control-parameters.

Optionally the control-parameter system comprises one or more sensors onboard the aircraft configured to sense the one or more control-parameters. For example the one or more sensors may sense an environmental condition such as air quality, or a location of the aircraft such as an altitude or a global location.

Optionally the one or more control-parameters comprise a control-parameter indicative of an environmental condition local to the fuel tank.

Optionally the one or more control-parameters comprise a control-parameter indicative of a location of the aircraft.

Optionally the environmental condition is an air composition.

Optionally the air composition is an air quality, nitrogen oxide level, carbon dioxide level, or ozone level.

Optionally the one or more control-parameters comprise a control-parameter indicative of future route planning of the aircraft.

DETAILED DESCRIPTION OF EMBODIMENT(S)

Figure 1:
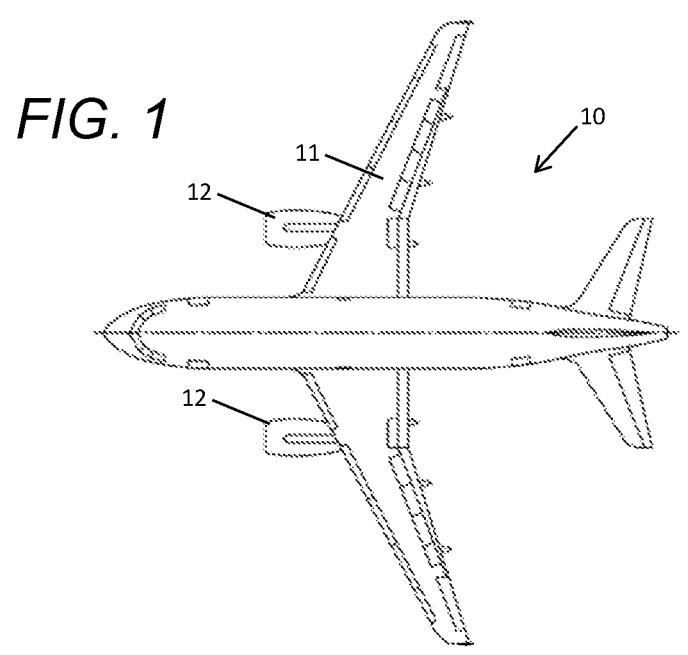
FIG. 1 is a plan view of an aircraft.
Figure 2:
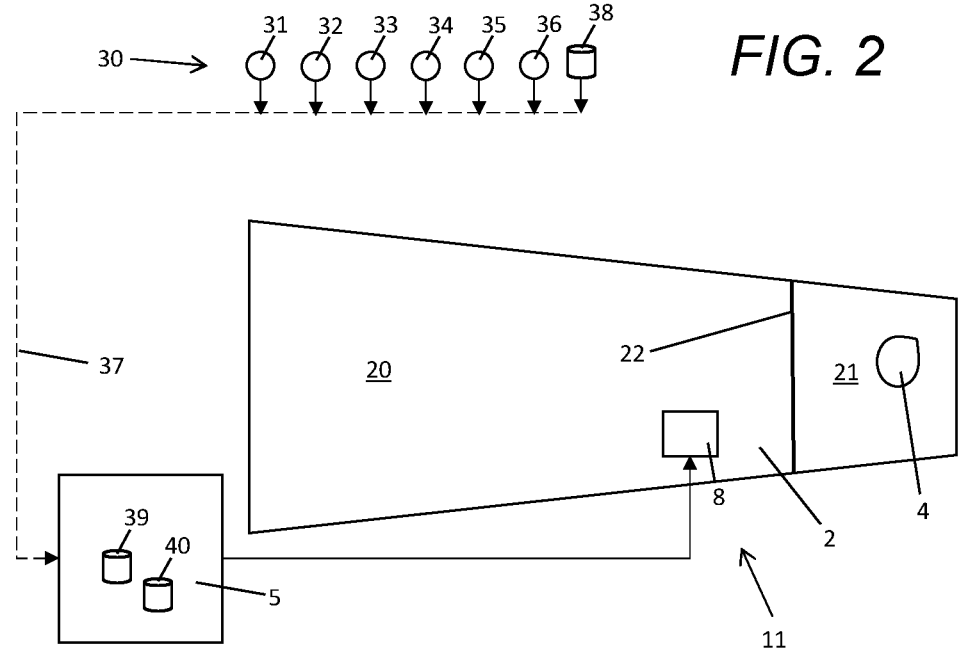
FIG. 2 is a plan view of a fuel system of the aircraft with an inerting system and an automated control system.

An aircraft 10 shown in FIG. 1 comprises a pair of wings extending from a fuselage. The aircraft comprises a fuel system for feeding fuel to wing-mounted engines 12. The fuel system comprises one or more fuel tanks in each wing, and a centre-tank. FIG. 2 is a schematic view showing the fuel system in the starboard wing 11.

The fuel system comprises a fuel tank 20 and a vent tank 21, separated by a boundary wall 22. The fuel tank 20 can be filled with liquid hydrocarbon aviation fuel and contains pumps (not shown) for feeding the fuel to the engine 12. An ullage above the fuel contains fuel vapour. An inerting system 8 is provided to feed inert gas into the ullage.

The inerting system 8 may comprise an On-Board Inert Gas Generation System (OBIGGS) which generates oxygen depleted air (ODA) as the inert gas. By way of non-limiting example, the OBIGGS may comprise a fuel cell system which produces the ODA, as described in US2014/0238501; or a gas separation module which takes gas from an engine bleed to provide the ODA, as described in US2016/176535.

Fuel vapour from the ullage can pass from the fuel tank 20 into the vent tank 21. The vent tank 21 has a NACA duct 4 or other opening on the underside of the wing, so the vent tank 21 is in fluid communication with the atmosphere. Hence the fuel vapour from the fuel tank 20 can be released indirectly into the atmosphere outside the wing, via the vent tank 21 and the NACA duct 4.

This release of fuel vapour into the atmosphere can be caused, or increased, by the flow of inert gas flow into the fuel tank 20 displacing the fuel vapour in the ullage.

An automated control system 5 is coupled to the inerting system 8. The automated control system 5 may comprise an avionics computer which hosts a commanding algorithm.

A control-parameter system 30 is configured to obtain control-parameters which are input to the automated control system 5.

For example, each control-parameter may be indicative of an environmental condition local to the fuel tank, a current location of the aircraft, or a future route plan of the aircraft.

The control-parameters may either be provided live or prior to the flight of the aircraft.

The control-parameter system 30 may comprise various environmental sensors configured to sense a control-parameter which is indicative of an environmental condition, such as a composition of the atmosphere local to the fuel tank outside the wing. The environmental sensors may comprise an air quality sensor 31 configured to sense air quality, and/or a nitrogen oxide ($NO_x$) sensor 32 configured to sense nitrogen oxide level, and/or a carbon dioxide ($CO_2$) sensor 33 configured to sense carbon dioxide level, and/or an ozone ($O_3$) sensor 34 configured to sense ozone level.

The environmental sensors 31-34 of the control-parameter system 30, in this example, are all onboard the aircraft 10. In another embodiment, the control-parameter system 30 may also include off-board environmental sensors which communicate a real-time environmental condition (such as air quality, nitrogen oxide level, carbon dioxide level or ozone level) to the automated control system 5 onboard the aircraft. The off-board environmental sensors may be ground-based, or satellite-based for example.

In the examples above, the control-parameter system 30 includes various sensors, which may or may not be onboard the aircraft. In another embodiment, the control-parameter system 30 may obtain a control-parameter by simply receiving an input (such as an Air Quality Index—AQI) from an off-board sensing system.

The control-parameter system 30 may also comprise various location sensors configured to sense a control-parameter which is indicative of a current location of the aircraft. The location sensors may comprise an altimeter 35 configured to sense an altitude of the aircraft, and/or a satellite navigation system 36 configured to sense a global location of the aircraft. The satellite navigation system 36 may comprises a Global Location System (GPS) system or any other type of Global Navigation Satellite System (GNSS) which determines global location coordinates of the aircraft.

The control-parameter system 30 may also comprise a memory 38 storing a flight plan of the aircraft.

The automated control system 5 is coupled to the control-parameter system 30 by one or more input lines 37. As explained in detail below, the commanding algorithm hosted by the automated control system 5 is configured to automatically generate command signals on a basis of the control-parameters and apply the command signals to the inerting system 8.

In general terms, the commanding algorithm assesses an environmental impact of the control-parameters for release of fuel vapour and automatically controls the inerting system 8 based on the assessment. This ensures that fuel vapour is released from the fuel tank 20 at a less environmentally damaging locations, for instance at high altitude, or over the sea.

The control-parameters generated by the location sensors 35, 36 give an indication of a current location of the aircraft. If the aircraft is at a high altitude, then the assessment by the commanding algorithm may indicate that fuel vapour can be released with relatively low environmental impact, so the automated control system 5 may turn on the inerting system 8.

If the aircraft is at a global location with a low population (for instance over the sea) then the assessment by the commanding algorithm may indicate that fuel vapour can be released with relatively low environmental impact, even at a low altitude, so the automated control system 5 may turn on the inerting system 8. This assessment may be made by comparing the current global location with a geographical database of population density, hosted in a memory 40 on the aircraft, or hosted off the aircraft.

Alternatively, if the aircraft is at a global location which is known to have local environmental conditions (for example high air quality) which make the release of fuel vapour less environmentally damaging, even at a low altitude, then the automated control system 5 may turn on the inerting system 8. This assessment may be made by comparing the current global location with a geographical database of air quality (real-time air quality per region, or expected air quality per region) which is hosted in the memory 40 on the aircraft, or hosted off the aircraft.

Alternatively, if the aircraft is at a global location which is known to have local regulations which indicate that the release of fuel vapour is less environmentally damaging, even at a low altitude, then the automated control system 5 may turn on the inerting system 8 in a similar way. This assessment may be made by comparing the current global location with a geographical database of local regulations, hosted in the memory 40 on the aircraft, or hosted off the aircraft.

By way of example, the local regulations associated with the current global location of the aircraft may state that emissions have low environmental impact.

In summary, the current location of the aircraft may be sensed (for instance its altitude and/or global location) using one or more of the location sensors 35, 36. The commanding algorithm assesses a suitability of the current location for release of fuel vapour, and the inerting system 8 may be turned on or off (or the inert gas flow rate otherwise controlled) on a basis of the assessment (optionally in combination with an assessment based on the control-parameters generated by the environmental sensors 31-34). This may prevent fuel vapour being released when the current location is not appropriate, for instance when the aircraft is at a low altitude near a population centre, or at a global location which is known to have a low air quality or regulations which state that emissions have a high environmental impact.

The control-parameters generated by the environmental sensors 31-34 give a real-time indication of an environmental condition (for example an air composition) of the atmosphere local to the fuel tank.

If the atmosphere has a low air quality, a high nitrogen oxide level, a high carbon dioxide carbon dioxide level, and/or a high ozone level, then the assessment by the commanding algorithm may indicate that fuel vapour should not be released, so the automated control system 5 may turn off the inerting system 8.

If the atmosphere has a high air quality, a low nitrogen oxide level, a low carbon dioxide carbon dioxide level, and a low ozone level, then the assessment by the commanding algorithm may indicate that fuel vapour can be released with low environmental impact, so the automated control system 5 may turn on the inerting system 8.

In summary, one or more environmental conditions local to the aircraft may be sensed, using one or more of the environmental sensors 31-34. The commanding algorithm assesses a suitability of the environmental condition for release of fuel vapour, and the inerting system 8 may be turned on or off (or the inert gas flow rate otherwise controlled) on a basis of the assessment (optionally in combination with an assessment based on the control-parameters generated by the location sensors 35, 36). This may prevent fuel vapour being released when the environmental conditions are not appropriate, for instance when the local air quality is already low and will be made worse by the release of the fuel vapour.

In the examples above, the automated control system 5 assesses a suitability of a current environmental condition local to the aircraft for release of fuel vapour, or a suitability of a current location of the aircraft for release of fuel vapour, and controls the inerting system 8 based on that assessment. Optionally the commanding algorithm of the automated control system 5 may also assess the suitability based on future route planning of the aircraft, as determined by the flight plan in the memory 38.

For example, if the flight plan indicates aircraft is due to fly into a region of lower air quality or higher population density at a future time, then the automated control system 5 may turn the inerting system 8 on (or keep it on) when not required for the current flight phase (for example cruise), to avoid emissions later in the flight where they have a high environmental impact. The reverse may also be true—if the aircraft is due to fly into a region of higher air quality or lower population density at a future time as part of the flight plan, then the automated control system 5 may turn off the inerting system 8 when it would otherwise not do so. In this example the control-parameter system 30 may be configured to determine (or otherwise obtain) one or more control-parameters indicative of future route planning of the aircraft (for instance by storing a flight plan in the memory 38), and the automated control system 5 may be configured to automatically control the inerting system 8 on a basis of the future route planning of the aircraft.

In the examples above an automated control system 5 on the aircraft hosts the commanding algorithm which controls the inerting system. In other embodiments, the commanding algorithm may be hosted offboard, and its outputs (for instance ON/OFF commands or an inerting plan) transmitted to the aircraft.

More specific embodiments of the invention will now be described in further detail.

Embodiment 1—Turning OFF Based on Current Global Location of Aircraft

A first embodiment comprises: a) obtaining a current global location of the aircraft by GPS during cruise; b) assessing an environmental impact of releasing fuel vapour at the current global location obtained in step a), by inputting the current global location into a database (the database may be hosted in the memory 40 on the aircraft, or hosted off the aircraft); c) receiving an output from the database that indicates that release of fuel vapour would have a high environmental impact (for example the current global location is above land) and turning off the inerting system 8 based on the output so that the inerting system 8 stops feeding inert gas into the ullage (assuming this will not cause flammability thresholds to be exceeded).

Embodiment 2—Turning ON Based on Current Global Location of Aircraft

A second embodiment comprises: a) obtaining a current global location of the aircraft by GPS during cruise; b) assessing an environmental impact of releasing fuel vapour at the current global location obtained in step a), by inputting the current global location into a database (the database may be hosted in a memory 40 on the aircraft, or hosted off the aircraft); c) receiving an output from the database that indicates that emissions would have a low environmentally impact (for example the current global location is above water) and turning on the inerting system 8 based on the output so that the inerting system starts feeding inert gas into the ullage.

Embodiment 3—Turning OFF Based on Current Altitude of Aircraft

A third embodiment comprises: a) obtaining a current altitude of the aircraft; b) detecting when the altitude drops below a threshold (typically during a descent phase of the aircraft); and c) turning off the inerting system 8 based on the detection so that the inerting system 8 stops feeding inert gas into the ullage (assuming this will not cause flammability thresholds to be exceeded).

Embodiment 4—Turning ON Based on Current Altitude of Aircraft

A fourth embodiment comprises: a) obtaining a current altitude of an aircraft; b) detecting when the altitude rises above a threshold (typically during a climb phase of the aircraft); and c) turning on the inerting system 8 based on the detection so that the inerting system 8 starts feeding inert gas into the ullage.

Embodiment 5—Turning OFF During Descent

A fifth embodiment comprises: a) obtaining a current location (for example global location or altitude) of the aircraft during a descent of the aircraft; b) assessing an environmental impact of releasing fuel vapour at the current location obtained in step a); and c) turning off the inerting system 8 during the descent of the aircraft based on the assessment so that the inerting system 8 stops feeding inert gas into the ullage (assuming this will not cause flammability thresholds to be exceeded).

Embodiment 6—Controlling Based on Future Global Location of Aircraft

A sixth embodiment comprises: a) obtaining a future global location of the aircraft (for example obtaining an identification of a destination airport for a current flight from a flight plan in the memory 38); b) assessing an environmental impact of releasing fuel vapour at the future global location obtained in step a), by inputting the future global location into a database (the database may be hosted in a memory 40 on the aircraft, or hosted off the aircraft), and receiving an output from the database that indicates that release of fuel vapour at the airport would have a high environmental impact (for example the output indicates that airport has low air quality); c) generating an inerting plan based on the assessment of step b), then controlling the inerting system 8 based on the inerting plan by turning on the inerting system 8 then turning off the inerting system 8 at or near the airport (assuming this will not cause flammability thresholds to be exceeded). For example the inerting system 8 may be turned on during cruise, then turned off during descent to the airport.

The inerting plan may be generated during the current flight or before the current flight.

The inerting plan may be stored in the memory 39 on the aircraft.

Embodiment 7—Controlling Based on Flight Plan

A seventh embodiment comprises: a) storing a flight plan of the aircraft in the memory 38, the flight plan comprising a series of airports the aircraft plans to visit during one or more flights (for example flight 1 LHR to JFK, flight 2 JFK to BHX); b) assessing an impact of releasing fuel vapour through the full flight plan by inputting the airport identifiers into a database (the database may be hosted in the memory 40 on the aircraft, or hosted off the aircraft), receiving an output from the database that indicates that emissions would have a high environmental impact at some locations along the flight plan, then (before or during flight 1) generating an inerting plan based on the assessment, the inerting plan being to operate the inerting system 8 at all times except where the environmental impact is high—assuming this will not cause flammability thresholds to be exceeded. The inerting system is then controlled in a final step c) during flights 1 and 2 based on the inerting plan.

The inerting plan may be generated during flight 1 or before flight 1.

The inerting plan may be stored in the memory 39 on the aircraft.

In embodiments 1-7 above, the inerting system 8 is controlled in a final step c) so that the inerting system 8 increases and/or decreases a flow rate of the inert gas into the fuel tank.

More specifically, the flow rate of the inert gas into the fuel tank may be controlled in the final step c) by turning the inerting system 8 off so that the inerting system 8 stops feeding inert gas into the fuel tank (i.e. the flow rate decreases to a zero flow rate) and/or turning the inerting system 8 on so that the inerting system 8 starts feeding inert gas into the fuel tank (i.e. the flow rate increases from a zero flow rate).

In other embodiments, the inerting system 8 may be controlled in the final step c) by increasing and/or decreasing a flow rate of the inert gas into the fuel tank between two non-zero flow rates.

Certain embodiments involve the generation of an inerting plan based on one or more expected future locations of the aircraft.

In any of the above embodiments, the automated control system 5 may host a surrogate model which predicts the current flammability level of the fuel tank, and the automated control system 5 may control the inerting system 8 based on the predicted current flammability level of the fuel tank as well as the assessment of environmental impact of releasing fuel vapour. So for example if the predicted current flammability level is high, then the inerting system 8 may not be turned off despite the fact that the assessment indicates that release of fuel vapour will have a low environmental impact. This ensures that flammability thresholds are not exceeded.

Where an inerting plan is generated before a flight, then the inerting plan may be generated based on the predicted current flammability level on the ground. So for example if the predicted current flammability level is low (e.g. the oxygen level in the fuel tank on the ground is low) then the inerting plan may be adjusted to turn the inerting system 8 off more soon during the flight than if the predicted current flammability level is high.

Also the surrogate model may predict future flammability of the fuel tank during a flight, and the inerting plan may be generated on the basis of the predicted future flammability as well as the assessment of environmental impact of releasing fuel vapour.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of controlling an inerting system of an aircraft, comprising:

operating the inerting system to feed inert gas into a fuel tank of the aircraft;

a) obtaining an expected future location of the aircraft;

b) assessing an environmental impact of releasing fuel vapour at the expected future location obtained in step a);

obtaining a current flammability level of fuel on the ground;

generating an inerting plan based on the assessment of step b) and the current flammability level of the fuel on the ground;

c) controlling the inerting system by increasing and/or decreasing a flow rate of the inert gas into the fuel tank, wherein the inerting system is controlled based on the inerting plan.

2. A method according to claim 1, wherein the location comprises a global location or altitude.

3. A method according to claim 1, wherein the location comprises a global location.

4. A method according to claim 1, wherein the location comprises an altitude.

5. A method according to claim 1, wherein the location comprises a current location of the aircraft.

6. A method according to claim 1, wherein step a) of obtaining an expected future location comprises receiving a flight plan of an aircraft, the flight plan comprising a series of expected future locations of the aircraft during one or more flights; and step b) of assessing comprises assessing an environmental impact of releasing fuel vapour at each of the series of expected future locations.

7. A method according to claim 1, wherein step c) of controlling comprises turning the inerting system off so that the inerting system stops feeding inert gas into the fuel tank and/or turning the inerting system on so that the inerting system starts feeding inert gas into the fuel tank.

8. A method according to claim 1, wherein the inerting system is controlled based on the inerting plan during a flight, and the inerting plan is generated before the flight.

9. A method according to claim 1, wherein step c) of controlling is performed automatically by an automated control system.

10. A method according to claim 1, further comprising: obtaining an environmental condition local to the aircraft; assessing an environmental suitability for release of fuel vapour based on the environmental condition; and controlling the inerting system based on the assessment.

11. An aircraft comprising: a fuel tank; an inerting system configured to feed inert gas into the fuel tank; and an automated control system coupled to the inerting system, wherein the automated control system is configured to control the inerting system by the method of claim 1.

* * * * *